US009143503B2

(12) United States Patent
Lo et al.

(10) Patent No.: US 9,143,503 B2
(45) Date of Patent: Sep. 22, 2015

(54) MANAGING TRUST RELATIONSHIPS (71) Applicant: Dell Products, L.P., Round Rock, TX (US)

(72) Inventors: Yuan-Chang Lo, Austin, TX (US); Charles D. Robison, Buford, GA (US); Clifton J. Barker, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 14/102,130

(22) Filed: Dec. 10, 2013

(65) Prior Publication Data

US 2015/0163217 A1   Jun. 11, 2015

(51) Int. Cl.
*H04L 29/06* (2006.01)
*G06F 17/30* (2006.01)
*H04L 12/18* (2006.01)

(52) U.S. Cl.
CPC ........ *H04L 63/0823* (2013.01); *G06F 17/3053* (2013.01); *H04L 63/14* (2013.01); *H04L 12/1813* (2013.01)

(58) Field of Classification Search
CPC ... H04L 63/20; H04L 63/102; H04L 12/1813; H04L 67/306

USPC ............................................................ 726/6
See application file for complete search history.

(56) References Cited

U.S. PATENT DOCUMENTS

2012/0047147 A1\* 2/2012 Redstone et al. ............. 707/748
2012/0290446 A1\* 11/2012 England et al. .............. 705/27.1
2013/0291098 A1\* 10/2013 Chung et al. .................. 726/21

OTHER PUBLICATIONS

Nguyen et al. Multiview: Improving Trust in Group Video Conferencing Through Spatial Faithfulness, May 2007, CHI, pp. 1465-1470.\*

\* cited by examiner

*Primary Examiner* — Dao Ho
(74) *Attorney, Agent, or Firm* — Fogarty, L.L.C.

(57) ABSTRACT

Systems and methods for managing trust relationships. In some embodiments, a method may include receiving an indication of an in-person transaction between a first user and a second user; calculating, for the first user, a trust score associated with the second user, the trust score based, at least in part, upon the indication; and storing a record of the trust score. For example, the in-person transaction may include a face-to-face meeting.

5 Claims, 6 Drawing Sheets

| SCORE | TRUST LEVEL | ICON | DESCRIPTION |
|---|---|---|---|
| 0-70 | LOW | 🔒 | LOW LEVEL OF TRUST HAS BEEN ESTABLISHED WITH PEER. RECOMMENDED TO DENY INCOMING PARTICIPATION REQUEST AND ENGAGE DIRECTLY WITH USER TO ESTABLISH FURTHER TRUST |
| 71-95 | MEDIUM | 🔒 | MEDIUM LEVEL OF TRUST HAS BEEN ESTABLISHED WITH PEER. PROCEED WITH CAUTION AND REVIEW INCOMING PARTICIPATION REQUESTS ON A CASE BY CASE BASIS |
| 96 AND ABOVE | HIGH | 🔒 | HIGH LEVEL OF TRUST HAS BEEN ESTABLISHED WITH PEER. THIS IS A VERY STRONG RELATIONSHIP THAT CAN BE RELIED UPON |

MANAGING TRUST RELATIONSHIPS

FIELD

This disclosure relates generally to computer systems, and more specifically, to systems and methods for managing trust relationships.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Furthermore, as mobile communications continue to proliferate, interactions between friends and colleagues also increases, as well as the variety of devices and tools used for such communications. In the workplace, for example, colleagues may routinely participate in-person meetings as well as "virtual collaboration sessions" or "virtual meetings." Generally speaking, "virtual collaboration" is a manner of collaboration carried out via IHS-mediated communication or other technological channels.

The inventors hereof have recognized that, because of our ever expanding contact lists, it becomes more and more difficult to remember who all our contacts are and what interactions we have had with them. This situation makes trusting a user's identity and associated decisions much more difficult. For instance, a user's confidence can be lost if adversaries can easily spoof as an otherwise trusted person or entity.

SUMMARY

Embodiments of systems and methods for managing trust relationships. In an illustrative, non-limiting embodiment, a method may include receiving an indication of an in-person transaction between a first user and a second user; calculating, for the first user, a trust score associated with the second user, the trust score based, at least in part, upon the indication; and storing a record of the trust score. For example, the in-person transaction may include a face-to-face meeting. Also, the first user may operate a first communication device and the second user may operate a second communication device, and the indication may be received in response to a face-to-face interaction between the first and second communication devices.

In some cases, the interaction may include at least one of: a file transfer, a message, an application sharing session, or a desktop sharing session. Moreover, calculating the trust score may include calculating a weighted mean among a one or more attributes and corresponding weights. For example, the one or more attributes may include a user registration of the second user with the IHS to receive one or more trust services. Additionally or alternatively, the one or more attributes may include an age of an account associated with the second user. Additionally or alternatively, the one or more attributes may include detection of malicious material on a device operated by the second user. Additionally or alternatively, the one or more attributes may include a physical distance between the first and second users during the in-person transaction. Additionally or alternatively, the one or more attributes may include a presence of a third user during the in-person transaction, and wherein the third user is registered with the IHS to receive one or more trust services.

The method may also include receiving another indication of another in-person transaction between the first user and the second user; and re-calculating the trust score associated with the second user, the trust score based, at least in part, upon the indication and the other indication. The method may include periodically reduce the trust score by a predetermined amount in the absence of subsequent in-person transactions. The method may further include transmitting a certificate to the first user with an indication of the trust score.

In another illustrative, non-limiting embodiment, a method may include detecting a locally initiated communication between the first user and a second user; calculating, for the first user, a trust score associated with the second user, the trust score based, at least in part, upon the locally initiated communication; and storing a record of the trust score. The locally initiated communication may include at least one of: a file transfer, a message, an application sharing session, or a desktop sharing session.

In some embodiments, calculating the trust score may include calculating a weighted mean among a plurality of attributes selected from the group consisting of: a user registration of the second user, an age of an account associated with the second user, detection of malicious material on a device operated by the second user, a physical distance between the first and second users during the locally initiated communication, and a presence of a third, registered user during the locally initiated communication.

The method may also include detecting, by the IHS operated by the first user, a remotely initiated communication between the first user and the second user; and determining whether to allow the remotely initiated communication based, at least in part, upon the trust score. The remotely initiated communication may include at least one of: an email, an instant message, a phone call, or a virtual collaboration session.

In yet another illustrative, non-limiting embodiment, a method may include receiving a first indication of a first transaction between a first user and a second user, wherein the first transaction takes place during a virtual collaboration session between the first and second users; calculating, for the first user, a trust score associated with the second user, the trust score based, at least in part, upon the first indication; receiving a second indication of a second transaction initiated by the second user toward the first user after the first transaction and outside of the virtual collaboration session; and updating the trust score in response to the second indication. The method may further include associating the second user with one of a plurality of trust levels, each of the plurality of trust levels corresponding to a selected range of trust scores.

In some embodiments, one or more of the techniques described herein may be performed, at least in part, by an Information Handling System (IHS) operated by a given one of a plurality of participants of a virtual collaboration session. In other embodiments, these techniques may be performed by an IHS having a processor and a memory coupled to the processor, the memory including program instructions stored thereon that, upon execution by the processor, cause the IHS to execute one or more operations. In yet other embodiments, a non-transitory computer-readable medium may have program instructions stored thereon that, upon execution by an IHS, cause the IHS to execute one or more of the techniques described herein.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
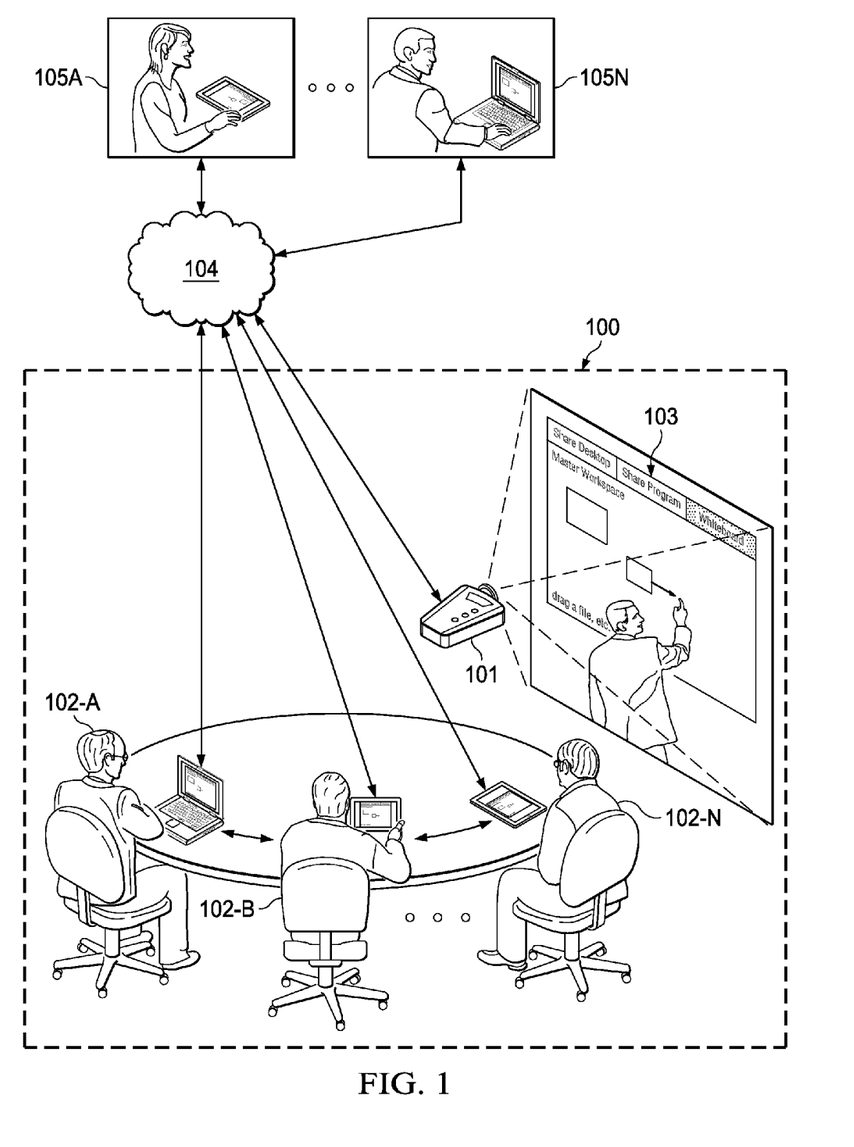
FIG. 1 is a diagram illustrating an example of an environment where systems and methods for managing trust relationships may be implemented according to some embodiments.

Turning to FIG. 1, a diagram illustrating an example of an environment where systems and methods for managing trust relationships may be implemented is depicted according to some embodiments. As shown, interactive collaboration tool 101 operates as a central meeting host and/or shared digital whiteboard for conference room 100 in order to enable a virtual collaboration session. In some embodiments, interactive collaboration tool may include (or otherwise be coupled to) a real-time communications server, a web server, an object store server, and/or a database. Moreover, interactive collaboration tool 101 may be configured with built-in intelligence and contextual awareness to simplify meeting setup and provide continuity between meetings and desk work.

In some implementations, for example, interactive collaboration tool 101 may include a video projector or any other suitable digital and/or image projector that receives a video signal (e.g., from a computer, a network device, or the like) and projects corresponding image(s) 103 on a projection screen using a lens system or the like. In this example, image 103 corresponds to a whiteboarding application, but it should be noted that any collaboration application may be hosted and/or rendered using tool 101 during a virtual collaboration session.

Any number of in-room participants 102A-N and any number of remote participants 105A-N may each operate a respective IHS or computing device including, for example, desktops, laptops, tablets, or smartphones. In a typical situation, in-room participants 102A-N are in close physical proximity to interactive collaboration tool 101, whereas remote participants 105A-N are located in geographically distributed or remote locations, such as other offices or their homes. In other situations, however, a given collaboration session may include only in-room participants 102A-N or only remote participants 105A-N.

Interactive collaboration tool 101 and participants 102A-N and 105A-N may include any end-point device capable of audio or video capture, and that has access to network 104. In various embodiments, telecommunications network 104 may include one or more wireless networks, circuit-switched networks, packet-switched networks, or any combination thereof to enable communications between two or more of IHSs. For example, network 104 may include a Public Switched Telephone Network (PSTN), one or more cellular networks (e.g., third generation (3G), fourth generation (4G), or Long Term Evolution (LTE) wireless networks), satellite networks, computer or data networks (e.g., wireless networks, Wide Area Networks (WANs), metropolitan area networks (MANs), Local Area Networks (LANs), Virtual Private Networks (VPN), the Internet, etc.), or the like.

Figure 2:
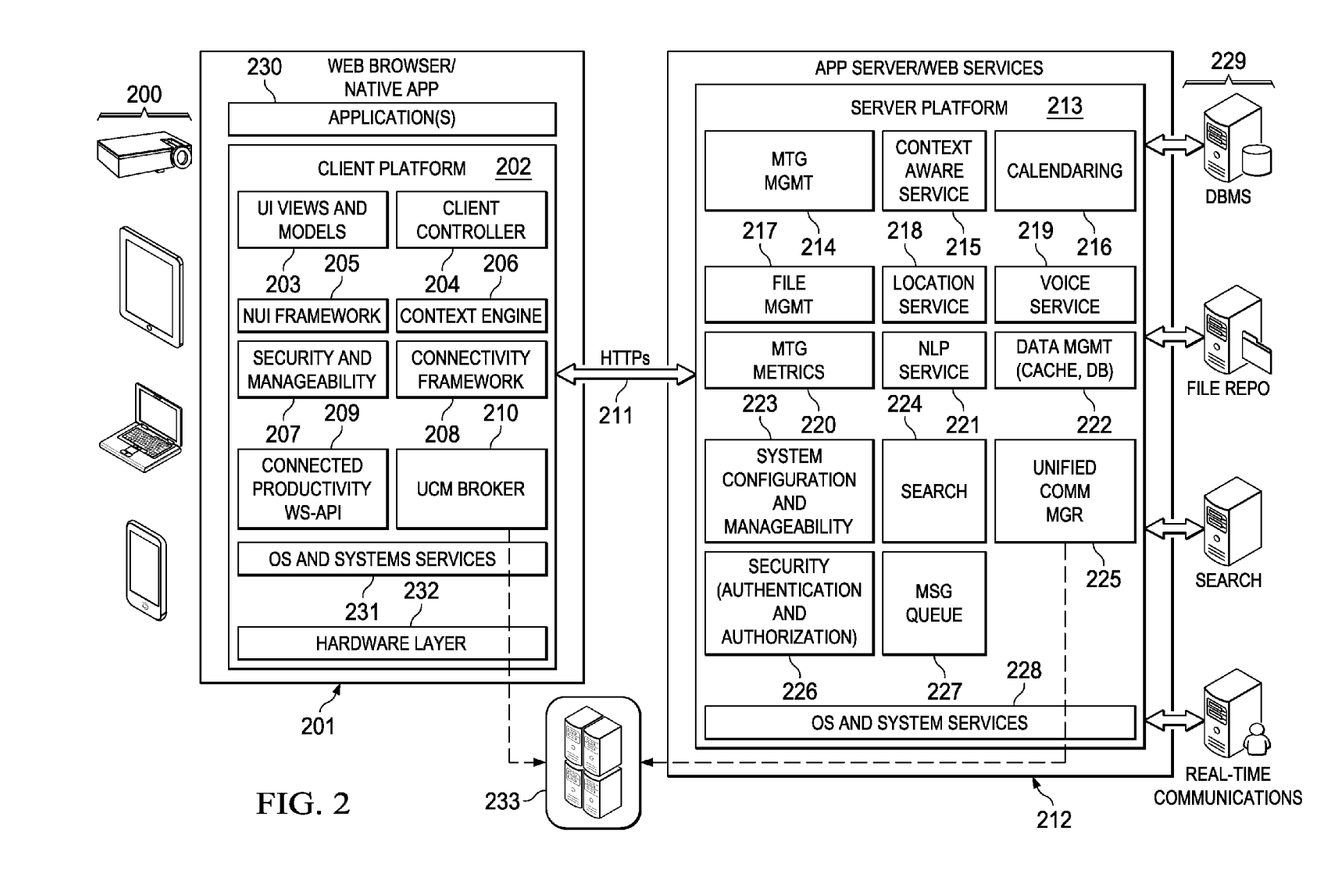
FIG. 2 is a block diagram of a cloud-hosted or enterprise service infrastructure for managing information and content sharing in a virtual collaboration session according to some embodiments.

FIG. 2 is a block diagram of a cloud-hosted or enterprise service infrastructure. In some embodiments, the infrastructure of FIG. 2 may be implemented in the context of environment of FIG. 1 for managing information and content sharing in a virtual collaboration session. Particularly, one or more participant devices 200 (operated by in-room participants 102A-N and/or remote participants 105A-N) may be each configured to execute client platform 202 in the form of a web browser or native application 201. As such, on the client side, one or more virtual collaboration application(s) 230 (e.g., a whiteboarding application or the like) may utilize one or more of modules 203-210, 231, and/or 232 to perform one or more virtual collaboration operations. Application server or web services 212 may contain server platform 213, and may be executed, for example, by interactive collaboration tool 101.

As illustrated, web browser or native application 201 may be configured to communicate with application server or web services 212 (and vice versa) via link 211 using any suitable protocol such as, for example, Hypertext Transfer Protocol (HTTP) or HTTP Secure (HTTPS). Each module within client platform 202 and application server or web services 212 may be responsible to perform a specific operation or set of operations within the collaborative framework.

Particularly, client platform 202 may include user interface (UI) view & models module 203 configured to provide a lightweight, flexible user interface that is portable across platforms and device types (e.g., web browsers in personal computers, tablets, and phones using HyperText Markup Language (HTML) 5, Cascading Style Sheets (CSS) 3, and/or JavaScript). Client controller module 204 may be configured to route incoming and outgoing messages accordingly based on network requests or responses. Natural User Interface (NUI) framework module 205 may be configured to operate various hardware sensors for touch, multi-point touch, visual and audio provide the ability for voice commands and gesturing (e.g., touch and 3D based). Context engine module 206 may be configured to accept numerous inputs such as hardware sensor feeds and text derived from speech. In some instances, context engine module 206 may be configured to perform operations such as, for example, automatic participant identification, automated meeting joining and collaboration via most effective manner, location aware operations (e.g., geofencing, proximity detection, or the like) and associated management file detection/delivery, etc.

Client platform 202 also includes security and manageability module 207 configured to perform authentication and authorization operations, and connectivity framework module 208 configured to detect and connect with other devices (e.g., peer-to-peer). Connected productivity module 209 may be configured to provide a web service API (WS-API) that allows clients and host to communicate and/or invoke various actions or data querying commands. Unified Communication (UCM) module 210 may be configured to broker audio and video communication including file transfers across devices and/or through third-party systems 233.

Within client platform 202, hardware layer 232 may include a plurality of gesture tracking (e.g., touchscreen or camera), audio and video capture (e.g., camera, microphone, etc.), and wireless communication devices or controllers (e.g., Bluetooth®, WiFi, Near Field Communications, or the like). Operating system and system services layer 231 may have access to hardware layer 232, upon which modules 203-210 rest. In some cases, third-party plug-ins (not shown) may be communicatively coupled to virtual collaboration application 230 and/or modules 203-210 via an Application Programming Interface (API).

Server platform 213 includes meeting management module 214 configured to handle operations such as, for example, creating and managing meetings, linking virtual workspace, notifying participants of invitations, and/or providing configuration for auto calling (push/pull) participants upon start of a meeting, among others. Context aware service 215 may be configured to provide services used by context engine 206 of client platform 202. Calendaring module 216 may be configured to unify participant and resource scheduling and to provide smart scheduling for automated search for available meeting times.

Moreover, server platform 213 also includes file management module 217 configured to provide file storage, transfer, search and versioning. Location service module 218 may be configured to perform location tracking, both coarse and fine grained, that relies on WiFi geo-location, Global Positioning System (GPS), and/or other location technologies. Voice service module 219 may be configured to perform automated speech recognition, speech-to-text, text-to-speech conversation and audio archival. Meeting metrics module 220 may be configured to track various meeting metrics such as talk time, topic duration and to provide analytics for management and/or participants.

Still referring to server platform 213, Natural Language Processing (NLP) service module 221 may be configured to perform automatic meeting summation (minutes), conference resolution, natural language understanding, named entity recognition, parsing, and disambiguation of language. Data management module 222 may be configured to provide distributed cache and data storage of application state and session in one or more databases. System configuration & manageability module 223 may provide the ability to configure one or more other modules within server platform 213. Search module 224 may be configured to enable data search operations, and UCM manager module 225 may be configured to enable operations performed by UCM broker 210 in conjunction with third-party systems 233.

Security (authentication & authorization) module 226 may be configured to perform one or more security or authentication operations, and message queue module 227 may be configured to temporarily store one or more incoming and/or outgoing messages. Within server platform 213, operating system and system services layer 228 may allow one or more modules 214-227 to be executed.

In some embodiments, server platform 213 may be configured to interact with a number of other servers 229 including, but not limited to, database management systems (DBMSs), file repositories, search engines, and real-time communication systems. Moreover, UCM broker 210 and UCM manager 225 may be configured to integrate and enhance third-party systems and services (e.g., Outlook®, Gmail®, Dropbox®, Box.net®, Google Cloud®, Amazon Web Services®, Salesforce®, Lync®, WebEx®, Live Meeting®) using a suitable protocol such as HTTP or Session Initiation Protocol (SIP).

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 3:
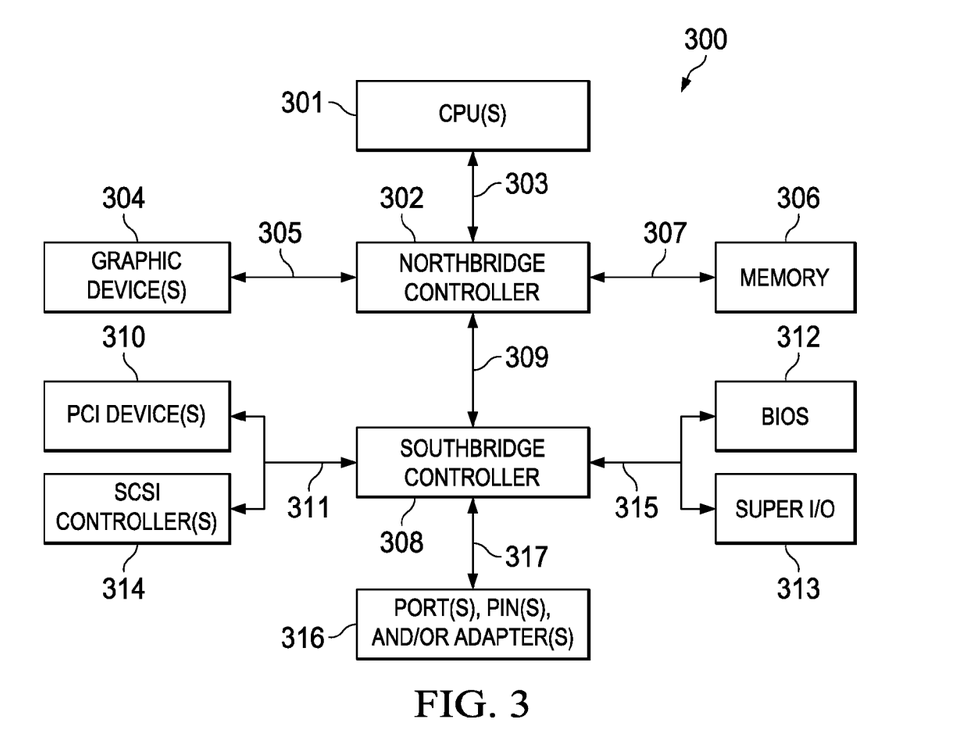
FIG. 3 is a block diagram of an example of an Information Handling System (IHS) according to some embodiments.

FIG. 3 is a block diagram of an example of an IHS. In some embodiments, IHS 300 may be used to implement any of computer systems or devices 101, 102A-N, and/or 105A-N. As shown, IHS 300 includes one or more CPUs 301. In various embodiments, IHS 300 may be a single-processor system including one CPU 301, or a multi-processor system including two or more CPUs 301 (e.g., two, four, eight, or any other suitable number). CPU(s) 301 may include any processor capable of executing program instructions. For example, in various embodiments, CPU(s) 301 may be general-purpose or embedded processors implementing any of a variety of Instruction Set Architectures (ISAs), such as the x86, POWERPC®, ARM®, SPARC®, or MIPS® ISAs, or any other suitable ISA. In multi-processor systems, each of CPU(s) 301 may commonly, but not necessarily, implement the same ISA.

CPU(s) 301 are coupled to northbridge controller or chipset 301 via front-side bus 303. Northbridge controller 302 may be configured to coordinate I/O traffic between CPU(s) 301 and other components. For example, in this particular implementation, northbridge controller 302 is coupled to graphics device(s) 304 (e.g., one or more video cards or adaptors) via graphics bus 305 (e.g., an Accelerated Graphics Port or AGP bus, a Peripheral Component Interconnect or PCI bus, or the like). Northbridge controller 302 is also coupled to system memory 306 via memory bus 307. Memory 306 may be configured to store program instructions and/or data accessible by CPU(s) 301. In various embodiments, memory 306 may be implemented using any suitable memory technology, such as static RAM (SRAM), synchronous dynamic RAM (SDRAM), nonvolatile/Flash-type memory, or any other type of memory.

Northbridge controller 302 is coupled to southbridge controller or chipset 308 via internal bus 309. Generally speaking, southbridge controller 308 may be configured to handle various of IHS 300's I/O operations, and it may provide interfaces such as, for instance, Universal Serial Bus (USB), audio, serial, parallel, Ethernet, or the like via port(s), pin(s), and/or adapter(s) 316 over bus 317. For example, southbridge controller 308 may be configured to allow data to be exchanged between IHS 300 and other devices, such as other IHSs attached to a network (e.g., network 104). In various embodiments, southbridge controller 308 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 308 may also enable connection to one or more keyboards, keypads, touch screens, scanning devices, voice or optical recognition devices, or any other devices suitable for entering or retrieving data. Multiple I/O devices may be present in IHS 300. In some embodiments, I/O devices may be separate from IHS 300 and may interact with IHS 300 through a wired or wireless connection. As shown, southbridge controller 308 is further coupled to one or more PCI devices 310 (e.g., modems, network cards, sound cards, or video cards) and to one or more SCSI controllers 314 via parallel bus 311. Southbridge controller 308 is also coupled to Basic I/O System (BIOS) 312 and to Super I/O Controller 313 via Low Pin Count (LPC) bus 315.

BIOS 312 includes non-volatile memory having program instructions stored thereon. Those instructions may be usable CPU(s) 301 to initialize and test other hardware components and/or to load an Operating System (OS) onto IHS 300. Super I/O Controller 313 combines interfaces for a variety of lower bandwidth or low data rate devices. Those devices may include, for example, floppy disks, parallel ports, keyboard and mouse, temperature sensor and fan speed monitoring/control, among others.

In some cases, IHS 300 may be configured to provide access to different types of computer-accessible media separate from memory 306. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 300 via northbridge controller 302 and/or southbridge controller 308.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 300 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 302 may be combined with southbridge controller 308, and/or be at least partially incorporated into CPU(s) 301. In other implementations, one or more of the devices or components shown in FIG. 3 may be absent, or one or more other components may be added. Accordingly, systems and methods described herein may be implemented or executed with other IHS configurations.

In various embodiments, the virtual collaboration architecture described above may be used to implement a number of systems and methods in the form of virtual collaboration application 230 shown in FIG. 2. These systems and methods may be related to meeting management, shared workspace (e.g., folder sharing control, remote desktop, or application sharing), digital whiteboard (e.g., collaboration arbitration, boundary, or light curtain based input recognition), and/or personal engagement (e.g., attention loss detection, eye tracking, etc.), some of which are summarized below and explained in more detail in subsequent section(s).

For example, virtual collaboration application 230 may implement systems and/or methods for enhanced trust relations based on peer-to-peer (P2P) direct communications. In many situations people whom have not met in person may be in communication with each other via email, instant messages (IMs), and through social media. With the emerging P2P direct communications, face-to-face communication may be used as an out-of-band peer authentication ("we have met"). By attaching this attribute in a user's contact list, when the user is contacted by other people whose contact information indicates that they have interacted face-to-face, these systems and methods may provide the user a higher level of trust.

Referring back to FIG. 1, in-room participants 102A-N and remote participants 105A-N may interact with one another during the course of a virtual collaboration session hosted by interactive collaboration tool 101. In some embodiments, these interactions may be used to create and/or maintain trust relationships among users 102A-N and 105A-N. It should be noted, however, that the same principles discussed herein may be applied in the absence of such virtual collaboration sessions. In other contexts, which are not limited to the work environment, other forms of interactions may be used to create and/or maintain similar types of trust relationships.

Generally speaking, the trust relationship systems and methods described herein may leverage in-person, electronic transactions or communications (e.g., those that have taken place between two or more of in-room participants 102A-N) to assign or modify a trust score for one or more parties who have participated in those transactions or communications. For example, with peer-to-peer (P2P) direct communications (using Wi-Fi Direct, Near Field Communications (NFC), Bluetooth, etc.) users typically communicate or conduct transactions in close physical proximity to each other. In fact, these types of communications are almost always initiated from a face-to-face interaction. Moreover, in most cases, upon successfully completion of a face-to-face transaction or communication, a higher level of trust may be implied between users.

Upon completion of a face-to-face transaction or communication, a trust score may be calculated for the parties, for example, by taking a variety of attributes, assigning corresponding weights to each attribute, and calculating a weighted average of those attributes, as described in more detail below. The resulting trust score may be used to facilitate subsequent transactions or communications involving those parties. For example, later transactions or communications initiated remotely may take place after a virtual collaboration session is over and in-room participants 102A-N are no longer in the same room or otherwise in close physical proximity to one another. Examples of remotely initiated communications include, but are not limited to, emails, instant messages, phone calls, virtual collaboration sessions, etc. In those cases, the previously calculated trust score may be used to automatically allow or deny the remote transaction or communication, or to provide a user with trust information that allows him or her to manually accept or decline the remote transaction or communication.

In some embodiments, the trust relationship systems and methods described herein make take advantage of a trust relationship resulting from face-to-face interaction and may include users who participated in these sessions into a special "face-to-face" group, which has a higher level of identity trust than other groups or contacts. Thus, in some implementations, an application may utilize this feature to indicate the level of trust or trust score (e.g., with a special icon or color code) when displaying a user from this group within a list of other users or contacts, or when receiving invitations to participate in transactions or communications, such as, for example, instant messaging, file sharing, application/desktop sharing, or other on-line, peer-based collaboration activities.

In some implementations, an existing IHS or an application database employed for storing an otherwise known type of user account (e.g., address book, contact list, etc.) may be extended to accommodate the trust relationship features described herein. In other cases, a trust relationship database may be created for the sole or main purpose of storing trust scores and other trust-related data. In either case, trust scores may be persisted and available for update and querying as-needed by other applications. For example, a trust relationship system may be implemented, at least in part, as a service provided by server platform 213.

Assume, as a hypothetical example, that server platform 213 issues a first trust score of 120 (or any other value) to a first user and a second trust score of 101 (or any other value) to a second user, each user operating a respective IHS or communication device. Each trust score may reflect an age of an account associated with the user, detection of malicious material on the device operated by the user, a physical distance between the users during the locally initiated or "face-to-face" communication, the presence of a third, registered user nearby during the locally initiated communication, etc.

Then, assume that the first and second users complete a successful "face-to-face" transaction or communication (e.g., in the absence of a malicious event such as a virus or other malware being exchanged between the users). Hence, in response to the successful transaction, the first user's trust score is incremented to 121 (or any other incremented value) and the second user's trust score is incremented to 102 (or any other incremented value). The first and second users may then upload their respective updated trust scores to server platform 213, which are then stored in a database. In many cases, these techniques may then add a level of trust between users, even if they are not in the same organization, based on trust established through face-to-face and close proximity interactions.

It should be noted that, in various implementations, trust scores of a given user's peers may be particular for that user. Each relationship one-to-one relationship between participants results in a unique trust score. One user may have a given trust score associated with a peer, but an additional user may have a different trust score associated with that same peer. In this case, the first user may have had more (or more recent) in-person transactions with the peer than the second user, and therefore the first user may have a higher trust score for the peer than the second user.

Figure 4:
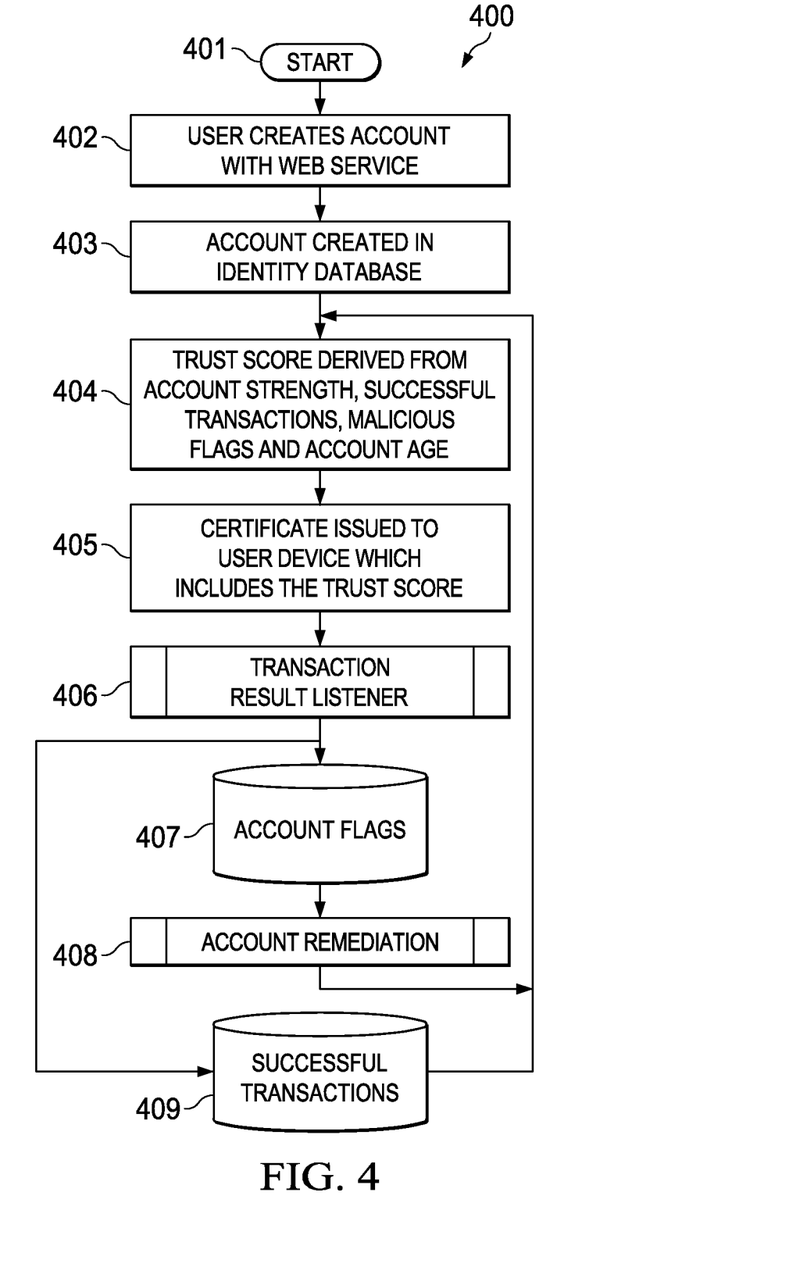
FIG. 4 is a flowchart of an example of a method for managing trust relationships from a service perspective according to some embodiments.

To better illustrate the foregoing, FIG. 4 is a flowchart of an example of a method for managing trust relationships from a service perspective. Particularly, method 400 begins at block 401 and may be performed, in some embodiments, by a user operating an IHS or other communication device to interact with security (authentication & authorization) module 226 of server platform 213. At block 402, a user creates an account for a trust relationship web service, and the account is created in an identity database at block 403. At block 404, method 400 includes deriving a trust score using data such as, for example, a number of successful (or unsuccessful) transactions performed by the user, the presence of malicious flags (or lack thereof), and the age of the account. Then, at block 405, method 400 includes issuing a certificate to the user's device which includes an indication of the trust score.

Block 406 initiates a transaction result listener, which is configured to receive the results of transactions or communications involving the user. If a successful transaction is received and stored at block 409, control returns to block 404 so that the trust score may be updated. Similarly, if a malicious flag or other problem is detected at block 407 and not remediated at block 408, control again returns to block 404 to update the trust score accordingly.

In some cases, a transaction or communication may be deemed successful if received or accepted by another user without resulting in a malicious flag or the like. In general, a malicious flag may result in some cases when the transaction or communication gives rise to the detection of a virus or other malware on the user's device. If the receiving user declines the transaction or communication, or if the transaction or communication otherwise results in an error and therefore is not completed, it may be deemed unsuccessful.

Figure 5:
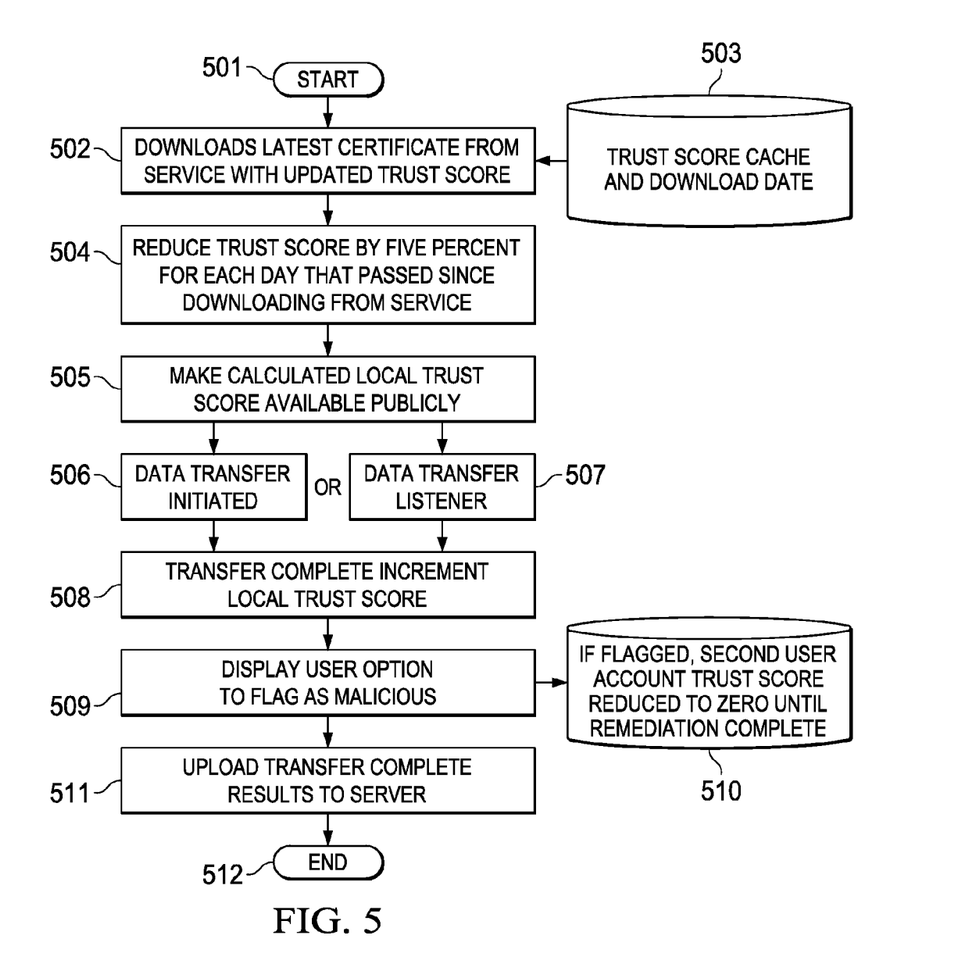
FIG. 5 is a flowchart of an example of a method for managing trust relationships from a user's perspective according to some embodiments.

FIG. 5 is a flowchart of an example of a method for managing trust relationships from a user's perspective. In some embodiments, method 500 begins at block 501 and may be performed, at least in part, by security (authentication & authorization) module 226 of server platform 213. At block 502, method 500 may include a user operating client platform 202 downloading the latest certificate, which verifies the authenticity (see below) with a current trust score from server platform 213 providing the trust relationship service. Trust scores may be stored in block 503 along with the download date of the certificate.

At block 504, method 500 includes reducing the trust score by 5% (or another predetermined amount) for each day (or other selected period of time) that has passed since the download of the certificate. This reduction or adjustment may be performed locally by the user's own client platform 202. At block 505, the calculated local trust score is made available publically, and then either at block 506 a data transfer or communication is initiated to another user or at block 507 a request for a data transfer or communication is received from another user.

At block 508, if electronic transaction is successfully complete, the trust score is incremented locally at client platform 202. At block 509, the user is displayed the option to flag the transfer or communication as malicious. If the user selects that option, block 510 includes reducing the trust score of the other user to zero or by a predetermined amount, until the other user demonstrably completes a remediation process (e.g., the other user eliminates a computer virus or the like). Then, at block 511, the results of the transactions and updated trust scores are updated to server platform 213, and method 500 ends at block 512.

In some embodiments, the transactions referred to in FIGS. 4 and 5 may include in-person or face-to-face transactions. These locally initiated transactions are those where users are in close physical proximity to each other. Typically, in-person transactions or communications occur when users are a few feet from each other, or may be attending a meeting or other event in the same room. In-person transactions are in contrast with remote transactions, where users may be in different rooms, buildings, cities, or countries. Usually, remote transactions are such that users' devices are far enough away from each other that P2P direct communications technologies are not possible or out of range.

In-person transactions may be identified as such to allow calculation of trust scores to be affected or modified by them. In some cases, when two users are in the same room and initiate a data transfer, communication, or other transaction using their respective devices, P2P communication technologies may be used to determine that those users were in fact in the presence of one another during the transaction. Additionally or alternatively, location technology such as Global Positioning Satellite (GPS) coordinates may be gathered at the moment of the transaction and compared to verify that the partiers were in the same location. Once determined that the transaction was performed as an in-person or face-to-face transaction, an indication of that transaction, its outcome (successful or unsuccessful, accepted or declined, etc.), and other pertinent data may be provided to security (authentication & authorization) module 226 to facilitate calculation of trust score(s).

In some cases, the trust score may be calculated via a weighted mean defined as $\bar{x}=\Sigma_{i=1}^{n} w_i x_i$, where each data input or attribute $x_i$ is associated with a predefined non-negative weight $w_i$ for n attributes. Attributes may include user registration, malicious flags (i.e., malware detection on device), account age based on date created, and proximity with respect to existing registered users. As an example, consider the following defined trust inputs and corresponding weights for a hypothetical user shown in Table I:

TABLE I

| Trust Input Name | Weight ($w_i$) | Trust Input Value ($x_i$) |
|---|---|---|
| User Registration | 10 | 100 |
| No Malware Detected | 25 | 100, subtract 16 per detection or until 0 |
| Account Age | 5 | Delta days passed from date created |
| Certificate Issued to Device | 30 | 100 |
| Proximity Encounters | 30 | 64 (per encounter) |

In other words, the user registered their account 10 days ago, successfully completed the process in having a certificate issued to their device, was hit with a drive-by-download when they visited a website that contains two pieces of malware, and interacted with an existing user on 3 occasions. In this situation, the user's trust score $\bar{x}$ is 76.7, calculated as:

$$\bar{x}=(1000+1700+50+3000+1920)410+25+5+30+30)$$

$$\bar{x}=(7670)/(100)$$

$$\bar{x}=76.7$$

Figure 6:
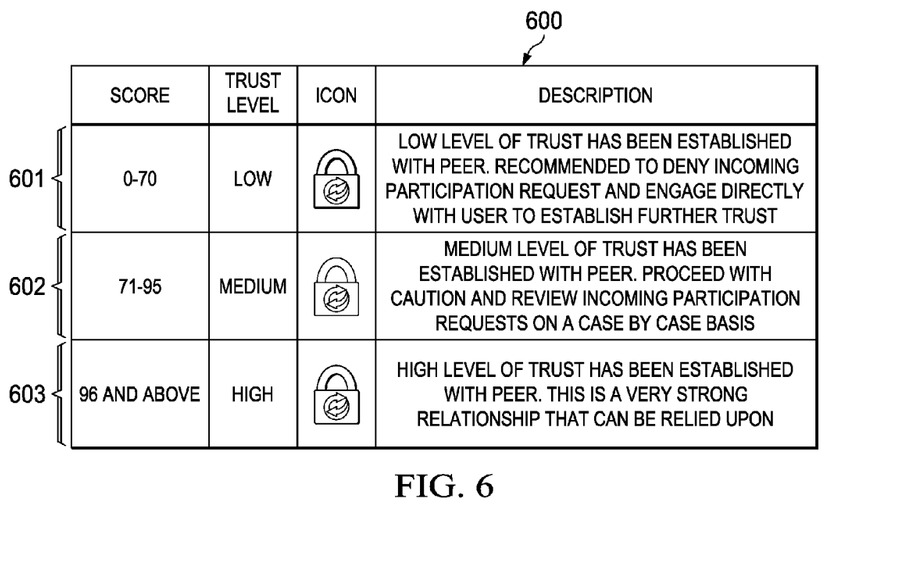
FIG. 6 is a graphic illustrating an example of different trust levels according to some embodiments.

In some cases, a numerical trust score may be translated into another type of trust score separated by ranges and designated as "low," "medium," or "high," for example. Moreover, the score may be combined with an icon of "trust" to display to the user, and the color and/or shape of the icon may itself convey an indication of the level of trust involved in a transaction. In that regard, FIG. 6 shows graphic 600 illustrating an example of different trust levels according to some embodiments. In this case, row 601 shows a numerical trust score between 0-70 translating into a "low" score and a red icon, which means that a low level of trust has been established with a peer. When receiving a transaction request from a peer with a low score, for instance, an application may evaluate the trust score and recommend that the user deny the incoming participation request and engage directly with that peer to establish further trust.

Row 602 shows that a numerical trust score of 71-95 translates into a "medium" score and a yellow icon, meaning that a medium level of trust has been established with a peer. When receiving a transaction request from a peer with a low score, for instance, an application may evaluate the trust score and recommend that the user proceed with caution and review incoming participation requests on a case by case basis. Also, row 603 shows a numerical trust score of 96 and above translating into a "high" score and a green icon, which means that a high level of trust has been established with a peer. Upon evaluation, an application may determine that there is a very strong relationship between the user and the peer that can be relied upon.

Trust scores may be kept with a user entry in a database then issued to the corresponding endpoint device via a certificate. Although not always necessary, use of a certificate may help maintain authenticity and integrity by ensuring the trust score cannot be tampered with (issued from a trust source). A certificate also helps to persist the user's registration information locally on their devices. Additionally or alternatively, an authentication token such as a cookie or the like may be used.

With each successful P2P direct interaction, the trust scores of the parties are incremented. Any given user may then have the option to reset the trust score to zero, which then goes through a remediation process on the backend and/or skip the trust score increment after a successful direct P2P interaction (white-list user).

Figure 7:
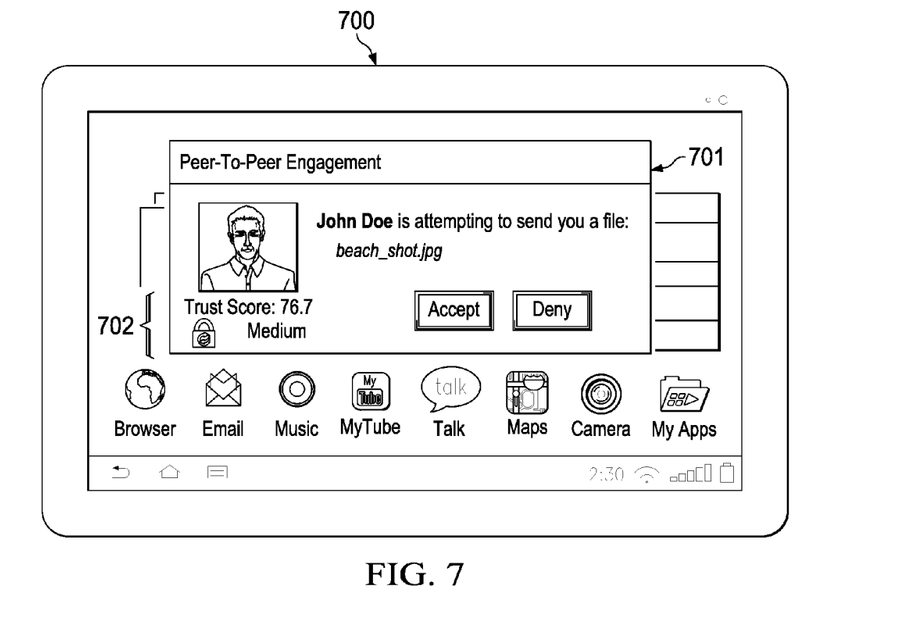
FIG. 7 is a screenshot of an example of a user device implementing certain systems and methods for managing trust relationships according to some embodiments.

FIG. 7 is a screenshot of an example of a user device implementing certain systems and methods for managing trust relationships according to some embodiments. In this case, a user operating device 700 receives peer-to-peer engagement notice 701 in the form of a pop-up window or the like. The notice indicates that a peer ("John Parker") is attempting to send a file to device 700. A numeric trust score ("76.7") as well as other trust score indications (a yellow icon and the "medium" classification) are provided in portion 702 of window 701, and the user has the opportunity to accept or deny the file transfer request based upon the trust indications associated with that peer. It should be understood that FIG. 7 is presented for purposes of illustration of an incoming P2P connection request, but that other application executed by device 700 may use the trust score of the peer in other ways, such as by highlighting email or instant messages or automatically blocking/accepting certain connections without presenting the peer's trust score information to the user.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A memory device having program instructions stored thereon that, upon execution by an Information Handling System (IHS), causes the IHS to:
   detect, by the IHS, a locally initiated communication between the first user and a second user, wherein the communication is determined to be locally initiated based upon an evaluation of a physical distance between the first and second users during the communication;
   calculate, by the IHS for the first user, a trust score associated with the second user, the trust score based, at least in part, upon the locally initiated communication, wherein calculating the trust score further comprises calculating a weighted mean among a plurality of attributes selected from the group consisting of: a user registration of the second user, an age of an account associated with the second user, detection of malicious material on a device operated by the second user, and a presence of a third, registered user during the locally initiated communication;
   store, by the IHS, a record of the trust score in a first user's contact list
   detect, by the IHS, a request for remotely initiated communication between the first user and the second user;
   retrieve, by the IHS, the trust score of the second user based upon the first user's contact list; and
   determine, by the IHS, whether to allow the remotely initiated communication to take place based, at least in part, upon the trust score.

2. The method of claim 1, wherein the locally initiated communication includes at least one of: a file transfer, a message, an application sharing session, or a desktop sharing session.

3. The method of claim 1, wherein the remotely initiated communication includes at least one of: an email, an instant message, a phone call, or a virtual collaboration session.

4. A non-transitory computer-readable medium having program instructions stored thereon that, upon execution by an Information Handling System (IHS), cause the IHS to:
   receive a first indication of a face-to-face transaction between a first user and a second user, wherein the first indication is based, at least in part, upon an evaluation of a physical distance between the first and second users during the face-to-face transaction;
   calculate, for the first user, a trust score associated with the second user, the trust score based, at least in part, upon the first indication;
   store the trust score associated with the second user in an address book or contact list of the first user;
   receive a request for a virtual transaction initiated by the second user toward the first user;
   retrieve the trust score from the address book or contact list;
   determine whether to warn the first user that the virtual transaction is potentially unsafe based upon the trust score;
   update the trust score in response to the request;
   reduce the trust score by a predetermined amount in response to an absence of subsequent face-to-face transactions for a predetermined amount of time;
   receive a second indication of a second face-to-face transaction between the first user and the second user; and
   re-calculate the trust score associated with the second user, the re-calculated trust score based, at least in part, upon the first and second indications.

5. The non-transitory computer-readable medium of claim 4, wherein the program instructions, upon execution by the IHS, further cause the IHS to associate the second user with one of a plurality of trust levels, each of the plurality of trust levels corresponding to a selected range of trust scores.

* * * * *